G. DYER.
BRUSH HANDLE.
APPLICATION FILED SEPT. 4, 1914. RENEWED MAR. 7, 1917.
1,224,724.
Patented May 1, 1917.
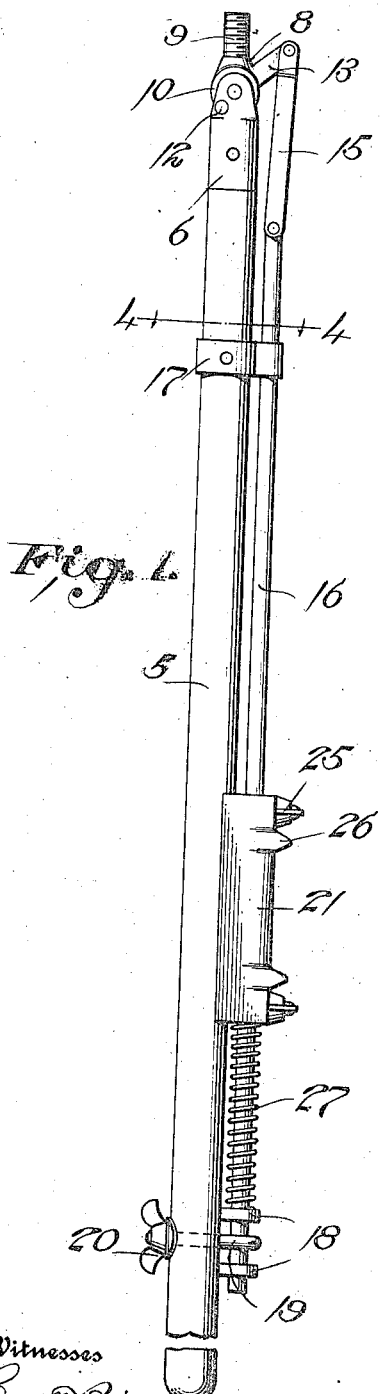
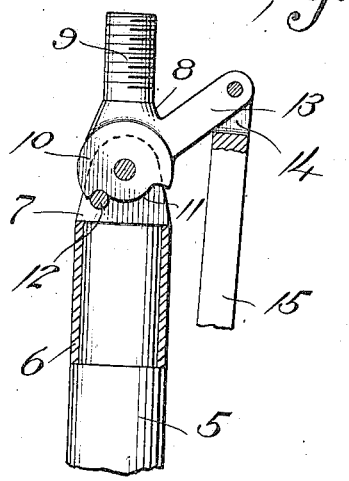
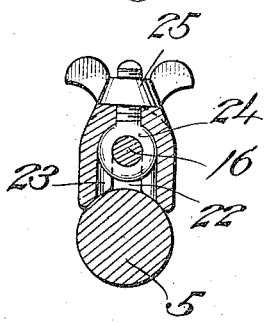
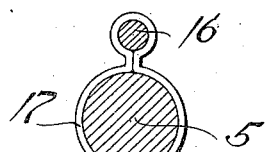
Witnesses
Inventor
George Dyer,
By Richard Owen.
Attorney

UNITED STATES PATENT OFFICE.

GEORGE DYER, OF WALLACETON, VIRGINIA.

BRUSH-HANDLE.

1,224,724.  Specification of Letters Patent.  Patented May 1, 1917.

Application filed September 4, 1914, Serial No. 860,255. Renewed March 7, 1917. Serial No. 153,171.

*To all whom it may concern:*

Be it known that I, GEORGE DYER, a citizen of the United States, residing at Wallaceton, in the county of Norfolk and State of Virginia, have invented certain new and useful Improvements in Brush-Handles, of which the following is a specification.

This invention relates to brush handles, the primary object being to adapt the same for use with various types of brushes, in which the positioning of the brushes at angles is permitted.

A further object is to permit the brush to be quickly adjusted to the desired position, at the same time, preventing its casual displacement.

Other objects as well as the nature, characteristic features and scope of my invention will be more readily understood from the following description taken in connection with the accompanying drawings and pointed out in the claims forming a part of this specification.

Referring to the drawings:

Figure 1 is a side elevational view of a handle constructed in accordance with my invention, Fig. 2 is a fragmentary elevational view of the same, portions thereof being broken away to disclose details, Fig. 3 is a transverse sectional view through the handle and the operating means for the brush engageable portion, and Fig. 4 is a sectional view taken on the line 4—4 of Fig. 1, looking in the direction of the arrow.

In the drawings wherein is illustrated the preferred embodiment of this invention, a handle portion 5 is provided which in the present instance is preferably made of wood and is of a cylindrical configuration. A ferrule 6 is arranged on one end of the handle 5 having its outer end bifurcated, as indicated at 7 and the branches of the bifurcation engaged with one end of the brush engageable member 8. Said brush engageable member in the present instance comprising a threaded shank 9 for engagement with the brush, and an integral disk portion 10 which is revolubly mounted between the branches of the bifurcation of the ferrule 6, a portion of the periphery of said disk being cut-out to provide an arcuate recess 11, in which is mounted a pin 12, to limit the movement of the member 8.

An arm 13 radiates from the outer periphery of the portion 10 of the brush engageable member and has the free terminal thereof in pivotal engagement with the bifurcated end 14 of a link 15, the latter having the opposite ends thereof pivotally engaged with one end of a shaft 16. The shaft 16 is slidably mounted on the handle portion 5 through a guide 17 and a pair of parallel guides 18. A hook-bolt 19 is engaged through the handle portion 5, the bill of the hook engaged about the shaft 16 and the shank thereof threaded for engagement with a thumb-nut 20. It is therefore seen that the shaft 16 may be readily actuated on the handle 5 in order to adjust the brush engageable portion 8, and will be positively held from displacement, if so desired, by engaging the hook-bolt 19 with the handle portion 5, as above set forth.

In order to facilitate actuation of the shaft 16 on the handle portion 5, an operating member 21 is provided, which in the present instance is of a substantially semi-cylindrical configuration and is provided therein with a longitudinally extending groove 22 which extends its entire length, and communicates with a pair of recesses 23, the latter being formed in proximity to the opposite terminals of the operating member 21 and being engaged by eye-bolts 24, the shank of each of the latter being threaded and engaged through an opening in said member, said shank being engaged by thumb-nuts 25, as shown to advantage in Fig. 3. Ribs 26 are formed on the outer periphery of the member 21 between which the hand of the operator engages, so as to prevent slipping of the hand, thereby insuring a quick actuation of the member on the shaft 16 for performing the desired result.

An elastic element 27, which in this instance is a coil-spring is encircled on the shaft 16, one end thereof being in engagement with the upper of the guides 18, and the opposite end in engagement with the lower end of the member 21, thereby normally forcing the same upwardly to hold the brush engageable portion 8 in a perpendicular position, as shown to advantage in Figs. 1 and 2. It is to be understood that the eyes of the eye-bolt 24 are engaged with the shaft 16, as shown to advantage in Fig. 3, after which the thumb-nuts 25 are threaded on the shank of said eye bolts 24, thereby holding the operating member 21 on the shaft 16 from displacement.

In operation, therefore it is seen, that the brush is engaged with the shank 9 of the member 8, after which pressure is exerted on the operating member 21 until the desired angle of the brush has been reached, or if it is desired, to use the brush when the member 8 is in a perpendicular position with the handle portion 5, pressure is exerted on the thumb-nut 20, which is necessarily loosened prior to the actuation of the shaft 16 on the handle, the tightening of the screw 20 causing the shaft 16 to bind in the openings of the guides 18, thereby positively holding said shaft 16 from displacement.

Although I have described this invention as adaptable for use with brushes of various types, it is to be understood that this invention is equally applicable and will perform an equally efficient result if used with hoes, window cleaners, or analogous implements which are desired to be disposed at various angles, at times.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention, what I claim as new and desire to secure by Letters Patent is:

1. A device as specified, including a handle, an object engageable end revolubly mounted on the handle, a shaft slidably associated with the handle and being in engagement with said object engageable member to operate the latter for disposing the same at various angles, a member adjustably mounted on said shaft to facilitate actuating the latter, an elastic element in connection with the handle and said member for normally holding said object engageable member in its extreme point of adjustment in one direction, and means carried by the handle and being in engagement with said shaft to hold the latter from displacement, at times.

2. A device as specified, including a handle, an object engageable member revolubly mounted in one end of said handle, a shaft slidably mounted on the handle and being in connection with said object engageable member to operate the latter for disposing the same at various angles, a member adjustably and detachably carried by said shaft to facilitate the actuation of the latter, a spring in connection with said handle and being in engagement with said member to normally hold said object engageable member coincident with the longitudinal axis of the handle, and means detachably mounted in said handle and being in engagement with said shaft to hold the latter from displacement, at times.

In testimony whereof I affix my signature in presence of two witnesses.

GEORGE DYER.

Witnesses:
HARRY K. WOLCOTT,
JAMES M. WOLCOTT.